G. W. Deweese,
Cultivator.
No. 76,412.   Patented Apr. 7, 1868.

Witnesses
Guy C. Humphries
Charles Herron

Inventor
G. W. Deweese
by
D. E. Somes & Co
his Attorneys

United States Patent Office.

G. W. DEWEESE, OF LIMA, OHIO.

Letters Patent No. 76,412, dated April 7, 1868.

---

IMPROVEMENT IN CULTIVATORS.

---

*The Schedule referred to in these Letters Patent and making part of the same.*

---

TO ALL WHOM IT MAY CONCERN:

Be it known that I, G. W. DEWEESE, of Lima, in the county of Allen, and in the State of Ohio, have invented an Improvement in Cultivators, by means of which the handles may be adapted to be held conveniently either by a boy or a tall man; and I do hereby declare that the following is a full, clear, and exact description thereof, reference being had to the annexed drawings, making part of this specification, in which—

Figure 1:
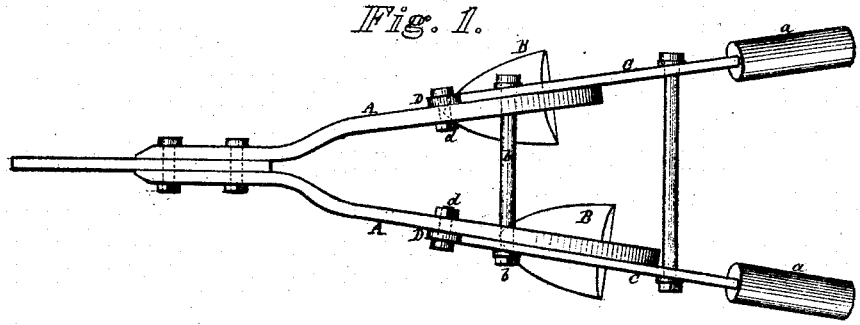

Figure 1 is a plan or top view, and

Figure 2:
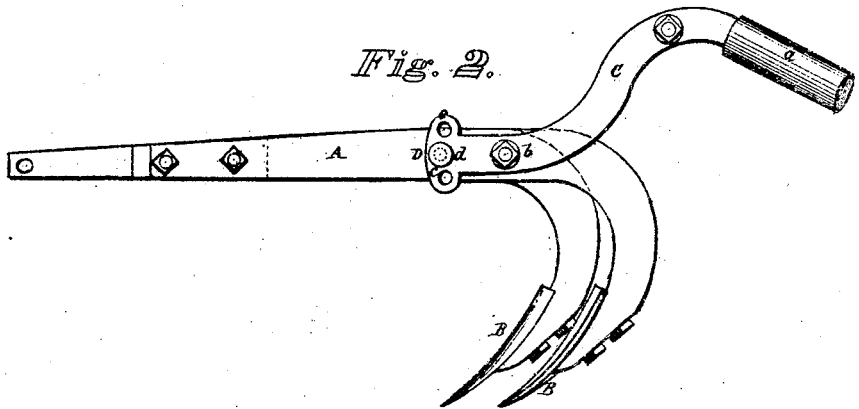

Figure 2 a side elevation of a cultivator showing my improvement.

A A are the draught-beams of the implement, and B B are the ploughs or shovels thereof. To the draught-beams are attached arms C, terminating in handles $a$, secured by the screw-bolts $b\ b$, so that said arms may be free to vibrate up and down. On the front ends of the arms C are segments D, having their centres in the bolts $b$, through which segments are two or more holes $c\ c$. The screw-bolts $d\ d$, or their equivalents, pass through one of the holes in the clevises, and through holes in the draught-beams B, holding the arms C and their handles at the proper altitude.

Having thus fully described my invention, what I claim as new, and desire to secure by Letters Patent, is—

The adjustable arms C and handles $a$, combined with the draught-beams of a cultivator, substantially as and for the purpose set forth.

In testimony that I claim the above-described improvement in cultivators, I have hereunto signed my name, this 6th day of September, 1867.

G. W. DEWEESE.

Witnesses:
THOMAS M. ROBB,
T. D. ROBB.